United States Patent [19]

Webster

[11] 4,133,506

[45] Jan. 9, 1979

[54] DERAIL SIGNAL SWITCH

[76] Inventor: Joseph Webster, 4309 Creek Rd., Conneaut, Ohio 44030

[21] Appl. No.: 847,438

[22] Filed: Nov. 1, 1977

[51] Int. Cl.² .............................................. B61L 3/04
[52] U.S. Cl. ................................. 246/172; 200/61.08; 246/246
[58] Field of Search ............... 200/61.08, 300; 246/76, 246/169 R, 170–173, 180, 199, 186, 246, 255; 303/19; 104/173 ST, 178, 179

[56] References Cited

U.S. PATENT DOCUMENTS

| 2,007,800 | 7/1935 | Graf | 246/246 |
| 2,391,228 | 12/1945 | Day | 246/170 |
| 2,831,965 | 4/1958 | Walker, Sr. | 246/246 |
| 3,021,423 | 2/1962 | Gilbert | 246/246 X |
| 3,822,369 | 7/1974 | Kunczynski | 200/61.08 |
| 3,936,621 | 2/1976 | Palin et al. | 200/61.08 |

Primary Examiner—Stephen G. Kunin
Attorney, Agent, or Firm—LeBlanc & Shur

[57] ABSTRACT

A system for sensing derailment of a remotely controlled engine including a switch integrated with a dead man control circuit for the engine to automatically stop the engine upon activation of the switch. The switch further includes a deformable copper pipe having a brass rod within the pipe but electrically insulated therefrom. The copper pipe with the brass rod, each having a terminal electrically connected to the circuit, is placed between rails in a rail yard. When the engine derails the wheels of the engine or some other part of the train press the copper pipe in communication with the brass rod thereby activating the switch and shutting down the engine.

12 Claims, 3 Drawing Figures

DERAIL SIGNAL SWITCH

BACKGROUND OF THE INVENTION

In railroad yards the engines are often remotely controlled to effect movement of the engine from one place to another within the yard. Depending on the location of the engine the control station may be at a distance from the engine where any malfunction of the engine or any of the cars being moved by the engine cannot be readily detected. As a result, where the engine or some other part of the train derails, the derailment may go undetected for some time resulting in substantial damage to the track as well as the engine and remainder of the train.

Detectors have been available to detect damaged rolling stock and in some cases to stop the train for repair or to otherwise appraise the damage. An example of this is the U.S. Pat. No. 2,007,800 to Graf which refers to a system that may bring a train to a halt upon sensing of the damaged rolling stock. In the preferred embodiment, however, the description is directed simply to signaling the crewman who would stop the train of their own volition. An electrical circuit is included in this system which maintains an electrical source integrated with a solenoid to prevent a switch from closing which controls a signal to stop the train. A part of the circuit includes a conductor mounted on a vertical member between the rails of the track. This vertical member is of a substance capable of being destroyed when struck by a violent blow. Thus, where a damaged part of the train extends sufficiently from the train to strike the vertical member, the circuit will be broken thereby de-energizing the solenoid allowing the switch to close. This in turn provides a signal imparted to the crew members that the train should be stopped.

The U.S. Pat. No. 746,499 to Guerin relates to an automatic system for stopping trains. The system disclosed includes a frangible device carried by the train to detect obstacles on the track and upon detection of such an obstacle to stop the train. Similar systems are disclosed in U.S. Pat. No. 1,012,493 to Willison and Wright and U.S. Pat. No. 1,200,339 to Graham and Farris. In all of these disclosures, the sensing device is actually carried by the engine or train itself.

The U.S. Pat. No. 1,372,122 to Dawson relates to an automatic train stop which is incorporated into an electrical circuit to stop the train when the engineer has failed to do so upon being appropriately signalled by a semaphore or the like. The Dawson device includes a mechanism located adjacent the rails having a frangible member which engages a switch arm for maintaining a switch in an open position unless the train fails to stop as required by the signal. The switch arm is actuated by a stop member located adjacent the track. In this way when the train goes beyond a predetermined point it engages the stop member forcing the switch arm to brake the frangible member allowing the switch to be closed which shuts down the engine. However, the Dawson device merely goes into operation when the signal is activated by some other source giving visual indication to an operator that the train should be stopped.

Another system relating to railway signaling for monitoring worn wheels includes the U.S. Pat. No. 3,546,448 to Pelino. The Pelino patent discloses a detector placed adjacent to the tracks at a position where a worn wheel will strike the detector causing it to vibrate. These vibrations are sensed and delivered to an appropriate indicator so that the operator can see that certain wheels of the train are worn and should be replaced. It should be noted that these detectors require special casing when placed adjacent to the tracks so that they will not be operated by simple vibration caused by the rolling stock. This Pelino system is unusually sophisticated in the manner in which it senses the worn wheels. Due to this complexity a substantial amount of time will be required to place the detector in the correct location. Further, there is no disclosure in Pelino of incorporating any such system to stop a train automatically.

In general these sensing devices presently available and discussed above are the frangible type which are subject to vandalism or other inadvertent fracture. Others include devices carried by the train itself and are not particularly conducive to sensing derailment of the non-frangible type, they are often so complex as to be impractical for use in sensing derailments. In addition, many of these devices are used to simply signal a crewman rather than actually shutting the engine off. Others do not provide sufficient protection from the elements to insure that the mechanism will work properly even after exposure for long periods of time.

SUMMARY OF THE INVENTION

The invention disclosed herein overcomes the problems discussed above among others. Generally, the invention relates to a system for automatically shutting down a railroad engine when it or any one of the cars it is moving becomes derailed. The system is one which is efficient and relatively economical to operate avoiding the complexity and substantial costs which heretofore have characterized railroad sensing systems.

More specifically, the system includes a copper pipe having a brass rod extending along the center line of the pipe and displaced from the interior walls of the pipe. To maintain the brass rod in the proper position, insulators are secured to the rods in a manner which will keep it electrically insulated from the copper pipe. The ends of the pipe are fitted with rubber insulators to prevent moisture and other particles from leaking inside the pipe and to maintain the rod in the proper longitudinal disposition. Each end of the pipe is covered with a copper pipe cap to further seal and prevent any tampering or other means which might inadvertently create contact between the brass rod and the copper pipe. One wire is placed through a hole in one of the copper pipe caps and soldered onto the brass rod. Another wire is soldered directly to the exterior surface of the copper tube. The first wire is then connected through a source to one side of a coil operating a dead man control of the remotely controlled engine. The second wire is connected to the other side of the coil. In this way when a train derails, the outer copper pipe will be pressed into contact with the brass rod thereby closing the circuit and placing the coil in operation. The coil is integrated with the dead man control system to automatically stop the train when energized.

With this system, the tubes can simply be placed between or adjacent the rails in a convenient manner to the sensing system in operation. Because the switches are made of copper material they are not readily subject to vandalism of the readily frangible members which have characterized sensing systems in the past. Furthermore, because of the simplicity of the system substantial savings are achieved through cost of manufacture as well as ease of locating the switch adjacent the rails.

It is an object of this invention to provide a system which automatically shuts down a derailed train.

A further object of the invention is to provide a switch for incorporation with the system that automatically shuts down a derailed train which is substantially safe from vandalism and will only be activated upon the action of a train leaving the tracks or a car being otherwise derailed.

Another object of the invention is to provide a switch for operation by a derailed train which avoids the complexity of sophisticated systems resulting in efficiencies in cost of manufacture as well as in time saved by placing the switches in desired positions along the rails.

A further object of the invention is to arrive at a switch which senses derailed trains and is sufficiently sealed from the elements so that the switch will not be activated inadvertently.

These and other objects of the invention will be more apparent from the derailed description of the preferred embodiment as well as the claims.

DETAILED DESCRIPTION OF THE PREFERRED EMBODIMENT

Figure 1:
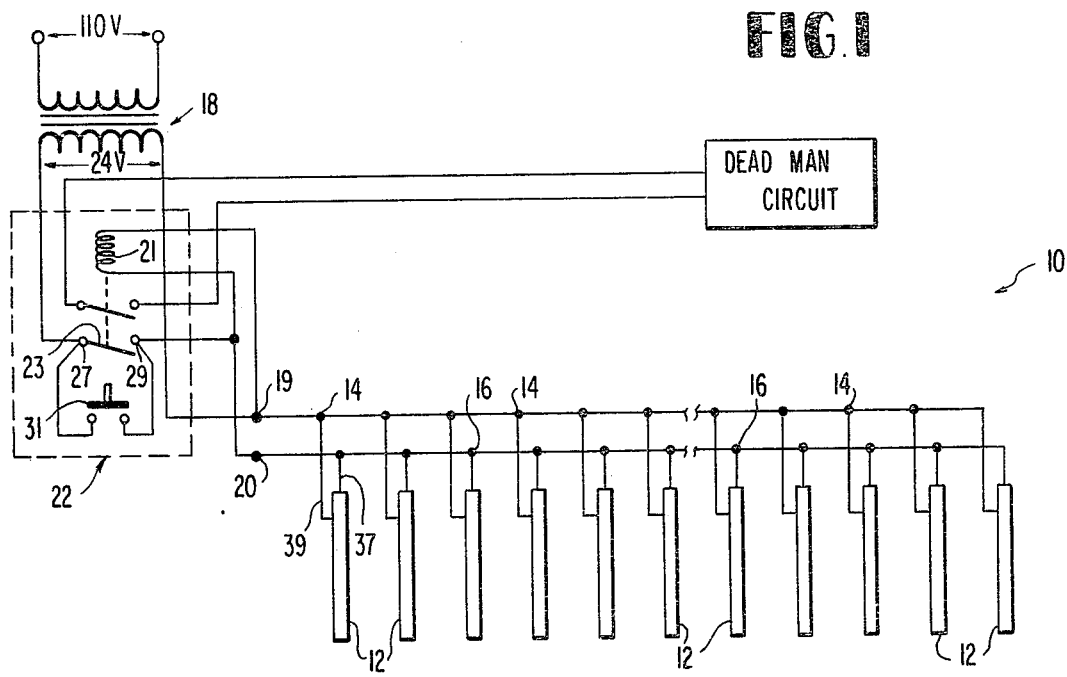

Referring to FIG. 1, there is shown a circuit 10 for sensing a derailed train and integrated with a dead man control to stop the train when the sensing mechanism is activated. The sensing mechanism includes crush switch 12 which has a first terminal 14 and a second terminal 16. The first terminal 14 is electrically connected to terminal 19 which is, in turn, connected directly to one side of 24 volt source 18. In the preferred embodiment, source 18 is transformed from a 110 volt source. Although any desirable source could be used, this transformation results in a relatively safe circuit for the operator and others who may contact the switches. The terminal 16 of the switch 12 is connected indirectly to the other side of the source 18 at terminal 20 through control mechanism 22. The control mechanism 22 includes interlock 23 connected between the source and terminal 20 at terminals 27 and 29. Also connected to terminals 27, 29 across the interlock 23 is a push button switch 31. The interlock 23 is integrated with coil 21 in a manner well known to those skilled in the art such that in an energized state, the coil 21 will maintain the interlock closed thereby keeping the circuit in operation. To place the circuit in operation, the push button switch 31 is closed which completes the circuit to energize coil 21. This in turn, closes interlock 23 which maintains the circuit in operation as explained above.

The dead man control is a circuit readily known to those skilled in the art employed for remotely operating an engine. It includes a switch which must be kept closed by the operator to keep the engine running. If the operator releases the switch, the power will shut off and the brakes automatically set to stop the engine immediately. The coil 21 of circuit 10 is integrated with the dead man control circuit to operate that circuit in the same manner as if the operator released the switch himself. In other words, when there is a derail the switch 12 is closed causing the coil 21 to be de-energized. This in turn, activates the dead man control circuit to stop the engine and set the brakes. In addition, a panel light integrated with the circuit will be lit for indication to the operator that a derailment has occurred. To return the engine to operation, the circuit 10 must be reset and the damaged switch 12 replaced.

Figure 2:
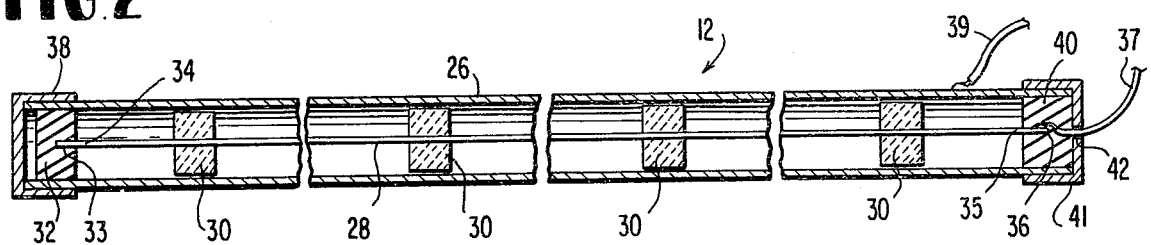
Figure 3:
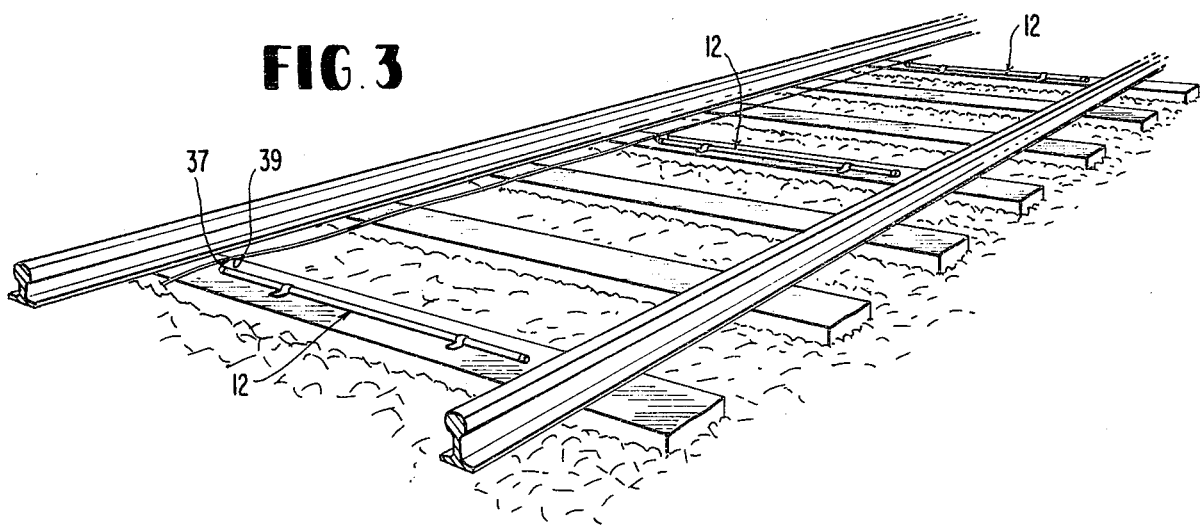

Each crush switch 12 includes a cylindrical copper pipe 26 containing a brass rod 28 therein located along the centerline of the pipe and insulated therefrom. To maintain the brass rod 28 in its insulated disposition within the copper pipe 26, four porcelain insulators 30 are placed equidistantly along the length of the brass rod 28, as can be seen in FIG. 2. Porcelain insulators 30 are disc shaped having an aperture through the center of the disc for engageably receiving the brass rod. The discs have a diameter slightly less than the inner diameter of the copper pipe 26. In this way, once the discs are placed in the proper position along the length of the brass rod 28, the rod with the insulators can simply be slid into position within the copper pipe 26.

At each end of the copper pipe 26 there is placed a rubber insulator 32 to seal one end of the copper tubing from moisture and other particles that otherwise might find their way into the tubing and form an electrical path between the brass rod 28 and the copper pipe 26.

As can be seen in FIG. 2, the end 34 of brass rod 28 extends only partially through the rubber insulator 32. The other end 35 of the brass rod 28 also extends partially into another rubber insulator 40. However, unlike the rubber insulator 32, the insulator 40 has an aperture extending entirely therethrough. A wire 37 extends through the aperture and is welded to the end 36 of the brass rod 28. With this configuration, the brass rod 28 is prevented from sliding along its longitudinal axis insuring that inadvertent contact between ends 34 of the brass rod 28 and the copper pipe 26 does not occur.

Each end of the copper pipe 26 is fitted with a cap 38, 41 to prevent entry into the pipe 26 thus securing the switch from vandalism. This also seals the pipe 26 from moisture and the like which might otherwise form an electrical path between the rod 28 and pipe 26. Each cap 38, 41 fits over the entire end of the pipe 26 and is soldered thereon entirely around the periphery to secure it in place. This completely seals the interior portion of the pipe along the interface between the pipe 26 and the caps 38, 41. The cap 41 has an aperture 42 to provide access for the wire 37. However, there is no leakage through this aperture 41 because of a seal created between the rubber insulator and the rod end 36 and wire 37. Another wire 39 is soldered to the outside of the pipe. These wires 37, 39 allow the switch to be secured to the terminals 14 and 16 of the circuit as shown in FIG. 1.

Unlike the porcelain insulators 30, the rubber insulators 32 have an outer diameter equal to or slightly larger than the inner diameter of the pipe. This allows the rubber insulators 32 to be force fitted into the ends of the copper pipe as well as for sealing purposes. A hole 33 is defined in each rubber insulator 32 along its axis to receive the ends of the brass rod 28. The hole 33 has a diameter which is equal or less than the outer diameter of the brass rod 28. In this way the rubber insulators can be force fitted over the ends 34 of brass rod 28 to secure the brass rod 28 in position within the copper pipe 26. The size of the copper pipe 26 employed herein is one half inch internal diameter copper tubing with a length of forty-five and one half inches. The rod 28 is a one-half inch outer diameter brass rod with a length of forty-five inches. These dimensions can be varied significantly and are included herein to describe those which are preferred.

In the preferred embodiment, several of the switches are secured on cross-ties between rails by the use of pipe clamps or any other convenient manner. The switches are of sufficient strength to withstand the pressure from a rubber tired vehicle such as a track cleaner or a car or truck. On the other hand, the engine or other rolling stock rolling over the switch will cause the outer tubular member to deform on contact with the brass rod. This closes the circuit as shown in FIG. 2, actuating the dead man control and stopping the engine as described. Thus, as the train proceeds down the track, if any one of the cars should derail it will cross the switch and close the circuit by crushing the outer tubular member 26 on the brass rod 32 actuating the dead man control.

With this invention the operator does not have to worry about vandalism or other inadvertent operation of the switch 10 which has plagued devices of the past. In addition, it has been found that the use of brass with copper in the manner described above impedes oxidation enhancing the life of the switch and insuring its operability for a significant length of time. Furthermore, the switch pipes are efficient in construction saving substantial cost in their manufacture. The simplicity of the subject invention is one which allows the operator to place them with relative ease along desired portions of the track. In this manner, substantial cost which has typified the more complex devices is eliminated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed is:

1. In a system for sensing derailment of a remotely controlled train comprising a sensing means for sensing the derailment of said train and a circuit means integrated with said train for stopping the derailed train when sensed by said sensing means, wherein said sensing means comprises:
   (a) a series of elongated deformable members;
   (b) a rod member contained within each said elongated deformable member and electrically insulated therefrom;
   (c) means for connecting said rod member and said deformable member to said circuit means for shutting down said train;
   (d) said circuit means being activated upon said deformable member being pressed into contact with said rod member by said derailed train;
   (e) said deformable members being of sufficient rigidity to withstand the pressure from a rubber tired vehicle such as a track cleaner, car or truck rolling thereover without being pressed into contact with said rod member;
   (f) said elongated deformable members having sealing means at each end thereof for sealing the internal portions of said deformable members from moisture and other materials external thereto;
   (g) said rod members being spaced from said deformable members by at least one electrical insulator supporting said rod members from said deformable members;
   (h) said elongated deformable members being secured on cross ties between said rails.

2. A system for sensing derailment of a remotely controlled rail train and automatically stopping the engine of the train comprising:
   (a) switch means located between said rails for sensing a derailed train;
   (b) said switch means having a first terminal and a second terminal wherein each terminal is comprised of electrically conductive material;
   (c) said switch means being maintained in a normally open position;
   (d) said first terminal being connected to one side of an electrical source;
   (e) said second terminal being connected to an actuating means for operating a dead man control, said actuating means being connected to the other side of said electrical source;
   (f) said dead man control being integrated with said engine to stop the engine operation upon energizing said actuating means by closing said switch means after sensing at least a portion of a derailed train;
   (g) said switch means comprising a deformable outer shell, and
   (h) an inner member located in spaced relationship within said outer shell for contact with said outer shell upon deformation of said shell by said derailed train;
   (i) said outer shell being connected to said first terminal;
   (j) said inner shell being connected to said second terminal whereby contact between the outer shell and the inner member as a result of deformation energizes said actuating means to automatically shut down said engine;
   (k) said deformable outer shell including a tubular member; and
   (l) said inner member including a brass rod having a diameter substantially less than that of said outer shell.

3. The system according to claim 2 wherein said rod is spaced from said outer tubular member by insulating means for preventing contact between the rod and the shell until deformation by said derailed train.

4. The system according to claim 2 wherein the ends of the tubular member include insulating means for preventing moisture from leaking into said tube.

5. The system according to claim 4 wherein said tubular member has a length less than the width between the rails on which the train travels.

6. The system according to claim 5 wherein said outer shell includes a copper pipe and said inner member includes a brass rod having a length less than the length of said pipe.

7. The system according to claim 6 wherein said means for preventing moisture from leaking into said tube include rubber insulating members secured to each end of said pipe and about said brass rod.

8. The system according to claim 7 wherein said first terminal has a first wire secured in electrical communication with said pipe and said second terminal has a second wire secured in electrical communication with said brass rod, said first and second terminal being secured to be insulated from one another.

9. In a system for sensing derailment of a remotely controlled train comprising a sensing means for sensing the derailment of said train and a circuit means integrated with said train for stopping the derailed train when sensed by said sensing means, wherein said sensing means comprises:
   (a) an elongated deformable member;

(b) a rod member contained within said elongated deformable member and electrically insulated therefrom;
(c) switch having means for connecting said rod member and said deformable member to said circuit means for shutting down said train;
(d) said circuit means being activated upon said deformable member being pressed into contact with said rod member by said derailed train;
(e) said deformable member having sealing means at each end thereof for sealing the internal portions of said deformable member from moisture and other materials external to said deformable member;
(f) said rod member being spaced from said deformable member by at least one electrical insulator substantially circumscribing said rod member; and
(g) said sealing means including at least one elastomeric insulator secured at the end of said tubular member.

10. The sensing means according to claim 9 wherein said deformable member is a copper pipe and said rod member is a brass rod.

11. The sensing means according to claim 10 wherein said switch means further includes copper cap members fitting over each end of said copper pipe and at least one of said copper cap members having an aperture therethrough for an electrical wire in electrical connection with said brass rod.

12. The sensing means according to claim 11 wherein said sensing means includes a plurality of said copper pipes with said brass rods therein placed on railroad ties in between said rail members.

* * * * *